United States Patent [19]

Isaacson et al.

[11] 4,093,832

[45] June 6, 1978

[54] PROGRAMMABLE RECORD CHANGER

[75] Inventors: Anson Isaacson, Chicago; Howard J. Morrison, Deerfield, both of Ill.; Ralph H. Baer, Manchester, N.H.; Donald K. Fletchic, Arlington Heights; Albert G. Keller, Chicago, both of Ill.

[73] Assignee: Marvin Glass & Associates, Chicago, Ill.

[21] Appl. No.: 682,079

[22] Filed: Apr. 30, 1976

[51] Int. Cl.² ............................................. G11B 19/14
[52] U.S. Cl. ..................... 179/100.4 D; 179/100.4 A; 179/100.3 V; 250/214 B; 250/570; 360/72; 274/15 R; 307/358; 274/23 R
[58] Field of Search ................ 179/100.4 D, 100.4 A, 179/100.4 R, 100.3 V, 100.1 PS, 100.41 L; 250/214 B, 570; 360/72, 78, 86; 274/15 R, 47, 23 R; 307/358, 355, 356, 352, 353

[56] References Cited

U.S. PATENT DOCUMENTS

| 2,952,464 | 9/1960 | Stimler | 179/100.4 D |
|---|---|---|---|
| 3,368,080 | 2/1968 | Nakagiri | 274/15 |
| 3,429,580 | 2/1969 | Hammond | 274/15 R |
| 3,661,397 | 5/1972 | Worth | 274/15 R |
| 3,867,628 | 2/1975 | Brown | 250/214 B |
| 3,937,903 | 2/1976 | Osann | 179/100.3 V |

*Primary Examiner*—Bernard Konick
*Assistant Examiner*—Alan Faber
*Attorney, Agent, or Firm*—Mason, Kolehmainen, Rathburn & Wyss

[57] ABSTRACT

A programmable phonograph record changer which provides automatic sound track selection for each of a plurality of records played sequentially by the record changer. The record changer includes an electro-optic scanner mounted on the pickup arm for sensing the land areas located between the various sound tracks of a disc-type record. An auxiliary tone arm lift and sweep mechanism is controlled by a digital logic system connected to the electro-optic scanner to drive the tone arm across various bands which the user does not want to be reproduced. The logic system includes a programmable memory which stores the preselected sound tracks of a sequence of records which the user intends to be reproduced. A land sensing circuit includes a means for developing a threshold signal which varies with the record surface reflectivity characteristics.

39 Claims, 18 Drawing Figures

PROGRAMMABLE RECORD CHANGER

BACKGROUND OF THE INVENTION

1. Field of the Invention

The present invention relates to phonograph record reproduction, and in particular to an automatic record changer permitting preprogrammed sound track selection.

2. Brief Description of the Prior Art

Various turntable systems have been proposed which are designed to permit a user to select a certain number of sound tracks to be played. Most recordings are sold in the form of a disc-type phonograph record where a plurality of sound track selections are spaced apart by land areas which include an unrecorded groove to carry the stylus to the next sound track selection. Often, a user of this type of phonograph record will want to hear fewer than all of the sound track selections on the record. One proposal is shown in U.S. Pat. No. 2,952,464 to M. Stimler. However, the system shown is very bulky and requires optical lenses mounted on the end of the tone arm. A later patent to Nakagiri et al U.S. Pat. No. 3,368,080 attempts to solve some of the problems encountered by Stimler's system by using two photocells which are spaced apart from one another to facilitate location of a land area. U.S. Pat. No. 3,937,903 to Osann utilizes an electro-optic sensor, including a light emitting diode and a phototransistor to measure reflective light from the record surface in an attempt to define or locate the land areas.

All of these devices are flawed by certain inadequacies with respect to their ability to handle recordings having particular characteristics. For example, Osann attempts to define a predetermined output level for the electro-optic sensor which will signal the appearance of a land area between two sound track portions. However, it has been found that the predetermined level varies greatly from record to record and over various portions of the same record. Thus there is a need for greater reliability in such a system. The present invention is directed to solving the practical problem of surface non-uniformity of commercial recordings.

SUMMARY OF THE INVENTION

An object of the present invention is to provide a sound track selector permitting preprogrammed selection of any one of several bands on each of a plurality of records and to retain this preselected program sequence in memory for a period of time.

Another object of the invention is to provide a novel tone arm lift and traverse mechanism for movement of the transducer stylus from the end of one sound track band to the beginning of another preselected sound track band.

In accordance with the above and other objects, the present invention provides a programmable phonograph record changer which permits the user to preselect any one or several bands on each of a plurality of records on the record changer. An electro-optic scanner is mounted on the end of the transducer arm for directing light to the face of the phonograph record and receiving reflected light therefrom. A land detecting means is connected to the scanner and includes an integrating comparator means for detecting the presence of a land area below the stylus. An auxiliary tone arm lift and sweep drive means are provided to move the stylus across the record to skip bands which are not intended to be reproduced. A control logic system is connected to the land detector and memory to actuate the auxiliary lift and sweep mechanism to position the stylus on the records to play a preselected sound track as dictated by the memory. A manual override switch is provided to actuate the auxiliary tone arm lift and sweep drive means to skip a preprogrammed sound track selection.

Other objects, features and advantages of the invention will be apparent from the following detailed description taken in connection with the accompanying drawings.

BRIEF DESCRIPTION OF THE DRAWINGS

FIGS. 12 through 18 are electrical schematic diagrams illustrating a digital logic system in accordance with the present invention.

DESCRIPTION OF THE PREFERRED EMBODIMENT

Figure 1:
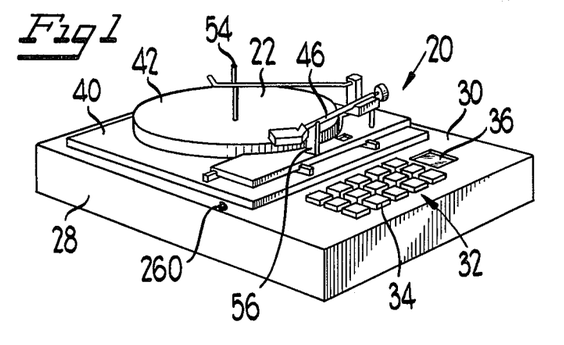
FIG. 1 is a perspective view of a record changer made in accordance with the concepts of the present invention.
Figure 1B:
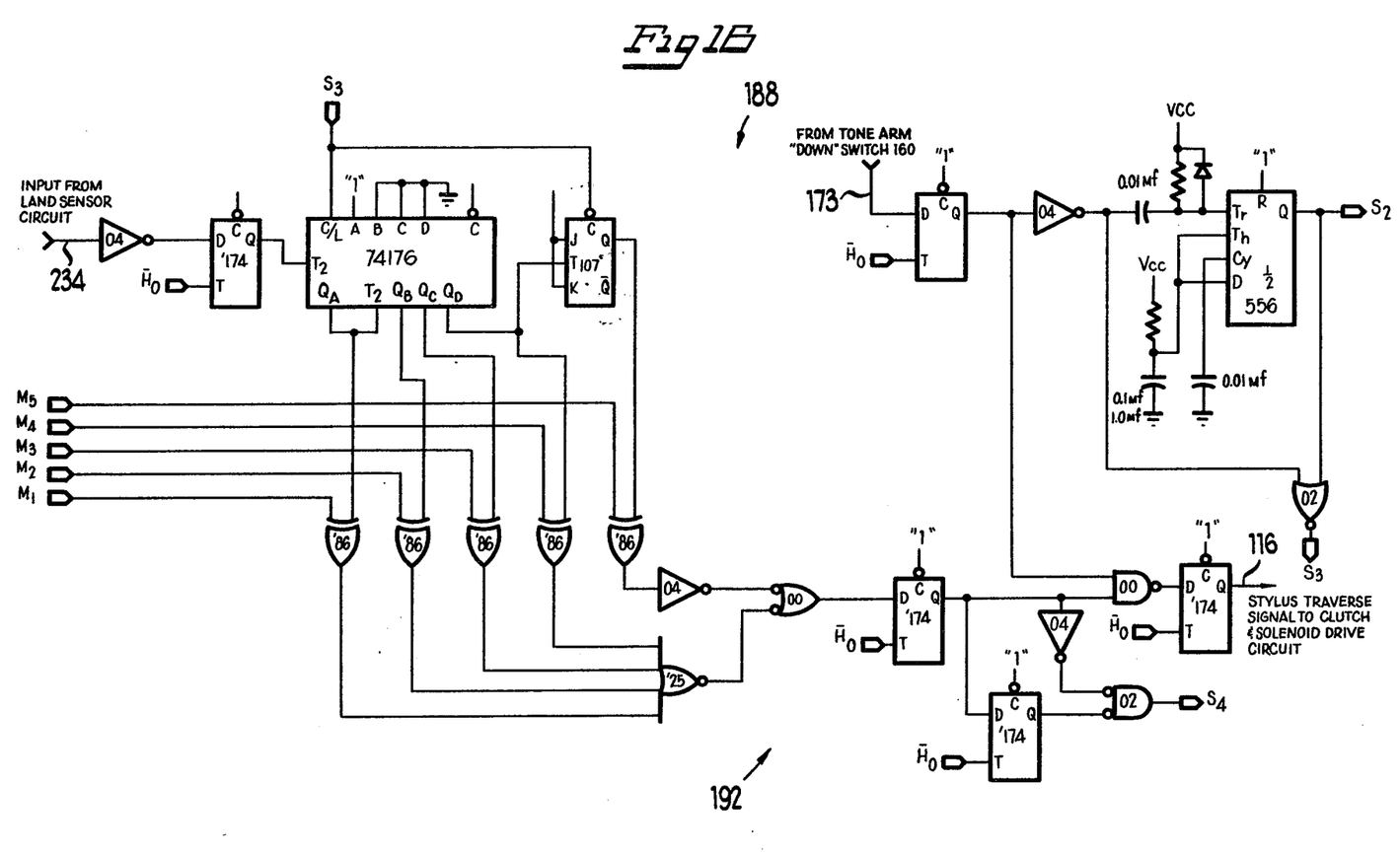

A record changer, generally designated 20, made in accordance with the concepts of the present invention is shown in FIG. 1. A conventional record changer 22, such as a BSR or equivalent type changer is modified to incorporate the addition of several mechanical elements and an electronic control unit 25 as shown in block diagram in FIG. 11. The additional elements do not affect the normal operation of the record changer which may be used in a conventional manner. For simplicity and clarity of disclosure, the mechanical and electronic elements will be treated separately in the following description.

I. Mechanical Elements

Figure 11:
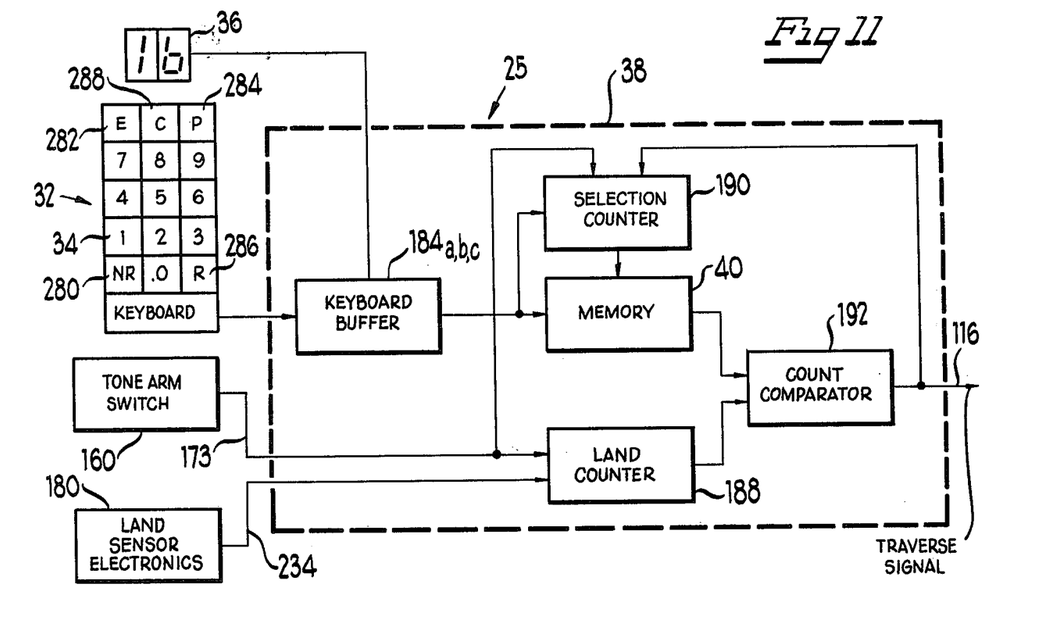
FIG. 11 is an electronic block diagram, schematically illustrating the overall system according to the present invention.

The record changer 22 is modified to include an enlarged base portion 28 having a top or upper surface 30 on one side thereof for mounting a keyboard, generally designated 32. The keyboard 32 includes a plurality of keys 34 and a digital display 36. The keyboard 32 is shown in FIG. 11 to be connected to a control means 38 in which keyed-in data is stored in a memory 40. The keyboard and memory 40 permit the user to select any particular number of sound tracks or bands to be played on the record changer. The device also accommodates the storing of information so that the selections to be played on all of the records stacked on the record changer can be programmed prior to the playing of the first record.

Figure 2:
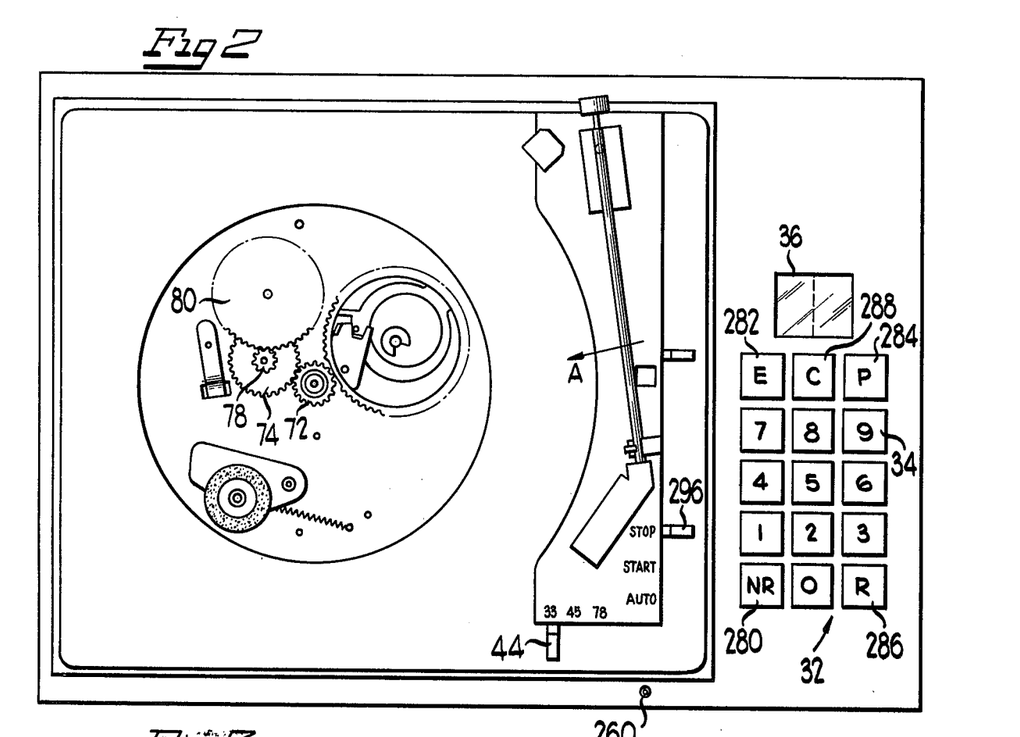
FIG. 2 is a top plan view, on an enlarged scale, of the record changer of FIG. 1, with the turntable removed.
Figure 3:
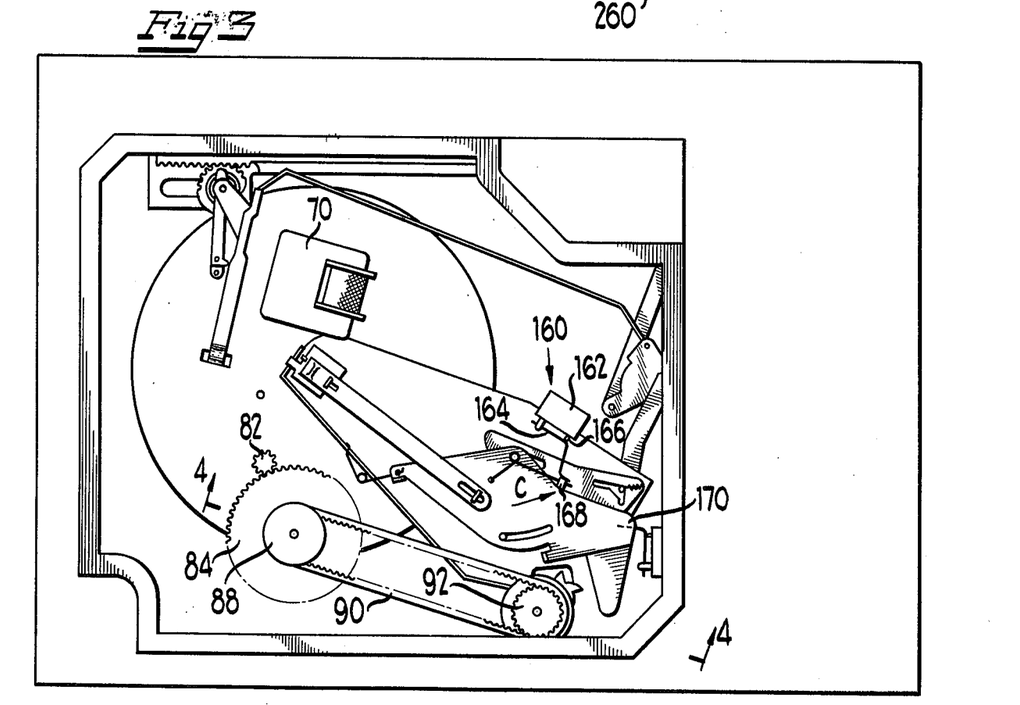
FIG. 3 is a bottom plan view of the record changer as shown in FIG. 2.
Figure 6:
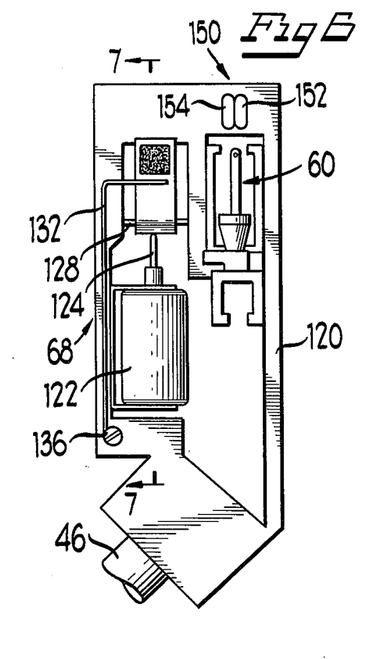
FIG. 6 is a bottom plan view, on an enlarged scale, of the free end of the tone arm showing the stylus and auxiliary tone arm lift mechanism.

FIGS. 2 and 3 show many of the mechanical components of a conventional record changer which need not be discussed herein. The record changer 22 includes a frame structure 40 which mounts the mechanical elements below the turntable or platter 42 for driving the platter at a predetermined speed, 33, 45 or 78 rpm as preselected by the selector knob 44 on the top of the phonograph 20. A tone arm 46 is pivotally mounted for horizontal movement by a vertical tone arm shaft 48 and for movement in a vertical direction by the tone arm yoke 50 and pin 52. A spindle 54 in the center of the turntable centers the records and also sequentially drops the records onto the turntable after the completion of each record. The tone arm is supported in a normal position on a tone arm rest 56 at the outer periphery of the turntable 42. Referring to FIG. 6, the tone arm 46 carries a conventional stylus and transducer, generally designated 60, for tracking in the grooves of the record for reproduction of the sound track selection. The record changer 22 is capable of placing the stylus 60 on the outer periphery of the record, playing the entire record, and returning the stylus to its rest position on the tone arm rest 56 or immediately playing the next record which is dropped by the spindle 54.

According to the concepts of the present invention, certain bands or sound track selections on a particular record are traversed, or "skipped" until the tone arm and stylus 60 reach the next preselected or programmed band to be played. To accomplish this, an auxiliary tone arm sweep drive means, generally designated 64, and an auxiliary tone arm lift means, generally designated 68, are provided.

Figure 4:
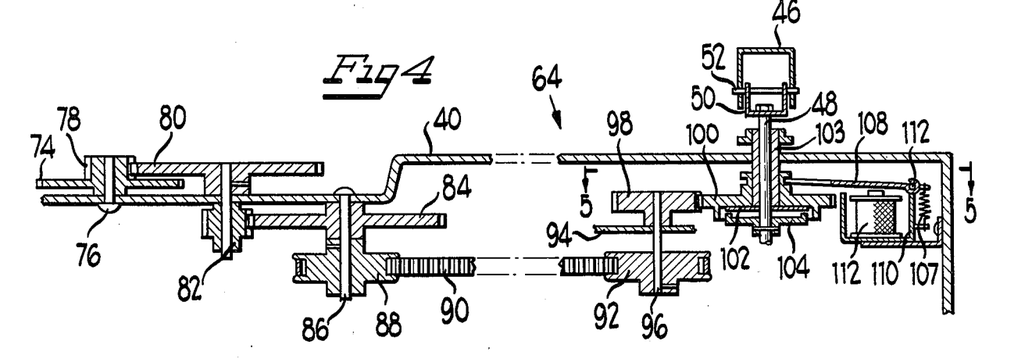
FIG. 4 is a partially fragmented vertical section, on an enlarged scale, of the auxiliary tone arm sweep drive means taken generally along the line 4—4 of FIG. 3.
Figure 5:
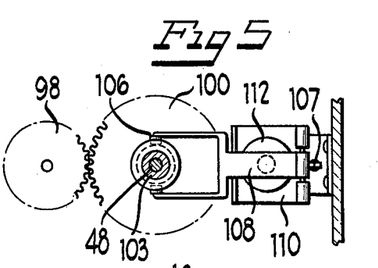
FIG. 5 is a horizontal section of the sweep clutch taken generally along the line 5—5 of FIG. 4.

More particularly, referring to FIGS. 2 through 5, the auxiliary tone arm sweep drive means derives its power from the same motor 70 which operates the record changer. In FIGS. 2 and 4, a central gear 72 is rotatably mounted coaxially with the spindle and drives a first idler gear 74 mounted to the frame 40 by a shaft 76. The idler gear 74 carries a pinion gear 78 which meshes with a second idler gear 80 on the upper surface of the frame 40. The second idler gear 80 is connected through the frame 40 to a smaller pinion gear 82 on the underside of the frame 40. The pinion gear 82 is in meshing engagement with a timing belt drive gear 84 which carries on its shaft 86 a timing belt gear 88. A timing belt 90 drives a similar second timing belt gear 92 which is rotatably mounted to a frame subplate 94 by a vertical shaft 96. The vertical shaft 96 carries an upper clutch drive gear 98 which is directly in mesh with a clutch gear 100. Referring to FIG. 4, the clutch gear 100 is mounted on a stationary vertical journal 103 for reciprocal vertical movement and rotary movement as driven by the clutch drive gear 98. The clutch gear 100 includes a clutch plate 102 which, when the clutch is actuated, engages a tone arm shaft clutch disc 104 keyed to the shaft 48. The clutch gear 100 includes a throwout bearing 106 (FIG. 5) carried by a yoke 108. The yoke 108 is mounted to a subframe assembly 110 for pivotal movement about a horizontal pin 112. The subframe 110 carries a clutch solenoid 112 which, when energized, engages the clutch plate 102 with the gear 104 to rotate the tone arm shaft 48 in a clockwise direction as shown by arrow A in FIG. 2. A biasing spring 107 supports the clutch gear 100 in its disengaged position when the coil 112 is not energized. As will be described in greater detail hereinafter with respect to FIG. 11, a traverse or sweep signal 116 from the control means 38 actuates the clutch solenoid 112 to cause the tone arm 46 to sweep inwardly.

Figure 7:
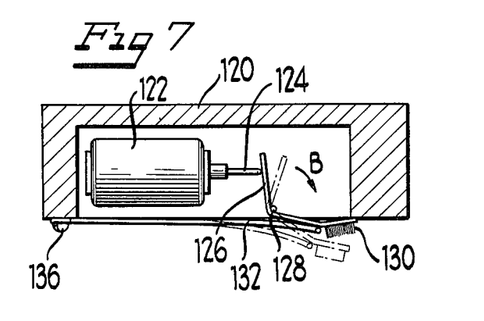
FIG. 7 is a vertical section of the tone arm lift mechanism, taken generally along line 7—7 of FIG. 6.
Figure 8:
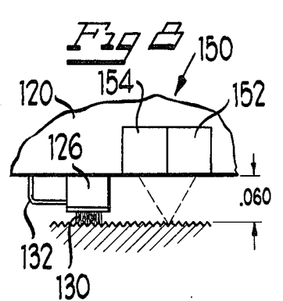
FIG. 8 is a front elevational view of the tone arm in its raised position.
Figure 9:
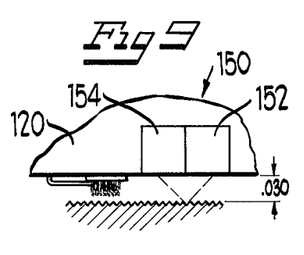
FIG. 9 is a front elevational view of the tone arm in its lowered position.

Simultaneously, with the actuation of the clutch solenoid 112, the traverse or sweep signal 116 actuates the auxiliary tone arm lift means 68 to lift the stylus 60 out of the record groove. The auxiliary lift means 68 as disclosed is particularly effective and desirable since it permits accurate lifting of the tone arm 46 and facilitates precise relocating of the stylus 60 onto the next desired sound track selection. The tone arm lift means 68 is mounted by a suitable frame structure 120 carried on the free end of the tone arm 46. The frame structure 120, as is conventionally done, in this case, also mounts the stylus and transducer 60. A solenoid 122 is mounted by the frame 120 with its armature 124 directed generally forwardly. Referring to FIG. 7, the solenoid armature 124 contacts a tone arm lift lever 126 which is pivotally mounted in the frame by a generally horizontal pin 128. A resilient pad 130 such as a piece of Velcro is mounted on the free end of the lift lever 126 and is held in a normally retracted position as shown in solid lines in FIGS. 7 and 9, by a retaining spring 132 mounted to the frame by suitable means such as a screw 136. When the lift solenoid 122 is actuated, the armature 124 engages the lever 126 and pivots the lever in a generally clockwise direction as shown by arrow B in FIG. 7 to its lift position as shown in phantom in FIGS. 7 and 8. When in engagement with the record surface, the contact point of the pad 130 is on a transverse center-line with the stylus 60. The position of the tone arm with respect to a recording surface is shown in FIGS. 8 and 9 with the lift solenoid 122 actuated, the tone arm in its "up" position and the lift solenoid 122 deactivated, the tone arm in its "down" position respectively. The lift solenoid 122 is energized at the same time as the clutch solenoid 112 when the sweep or traverse signal 116 is received from the control means 38.

Thus, it can be seen from the above description that the occurrence of a traverse signal 116 causes the lift solenoid to actuate and move the stylus to its up position (FIG. 8) and energizes the clutch to cause the tone arm to sweep or traverse inwardly at a substantially faster rate than during the play of a record. Typically, this inward travel is approximately ¼ inch per second as shown in the present system. However, the details of the auxiliary tone arm sweep and drive means 64 and 66, respectively, are exemplary only and may be modified to suit a particular turntable.

The electro-optic scanner, generally designated 150, is mounted by the frame 120 in alignment with the stylus 60. Particularly, the electro-optic scanner 150 includes a light emitting diode 152 and a phototransistor 154 in a side-by-side relationship on either side of an axial line through the stylus 60. The light from the light emitting diode is directed downwardly onto the surface of the record and reflected back up to be received by the phototransistor 154. As will be described in detail later, the electro-optic scanner 150 permits the detection of various land areas between sound track selections or bands. A sequential count of the bands detected by the electro-optic sensor is maintained and compared with the programmed memory to determine whether or not the sound track selection following the land area is to be played. If the next selection following a recognized land area is to be played, there is no traverse signal from the control means 38 and the stylus remains on the record to automatically play the next groove. However, if the next selection is not to be played, the traverse signal 116 energizes the tone arm lift mechanism 68 and drive mechanism 64 which lifts the stylus out of the record groove and pivots the tone arm inwardly until the arrival of a count corresponding to that preprogrammed in the memory.

In one embodiment which has been tested, the distance between the centerlines of the light emitting diode and phototransistor 152 and 154 is approximately 0.085 inches. In the stylus down position, as shown in FIG. 9, the electro-optic sensor 150 is located at approximately 0.030 inches from the surface of the record so that the angle between the emanating and reflected light is approximately 90°. In the tone arm "up" position, as shown in FIG. 8, the electro-optic sensor 150 is positioned approximately 0.060 inches above the surface of the record so that the angle is approximately 60°. The size of the frame member 120 on the end of the pickup arm substantially shadows the area of the record being "read" by the electro-optic scanner 150 and therefore any concern or effect from ambient light is abated by the shadowing effect. Furthermore, the electro-optic scanner 150 operates in very close proximity to the record surface, i.e., 0.030 or 0.060 inches, and emits very bright infrared light pulses so that the effects of ambient light are negligible.

The standard lift and return mechanism for the tone arm is operated by a plurality of cams built into the record changer and, during the return sweep of the tone arm 46 to its rest position, the stylus and thus the electro-optic scanner is at a substantially higher elevation with respect to the record surface during the return sweep. During this period of movement of the tone arm 46, the scanner 150 itself does not operate and a tone arm switch means, generally designated 160 (FIGS. 3 and 11), is provided to indicate to the control means 38 that the scanner 150 is not in an operating position. The tone arm switch means 160 includes a microswitch 162 mounted to the bottom of the frame 40 in a stationary position. The microswitch 162 includes a pivotally mounted actuated lever 164 which engages the switch button 166. The pivoted lever 164 is bent in a modified Z-shape to contact a tab 168 on the movable cam plate 170. The cam plate 170 moves in a rotational and translation type motion generally in the direction of arrow C (FIG. 3) when the conventional tone arm reaches the innermost groove on the record, the cam plate 170 moves in the direction of arrow C which lifts the tone arm in a conventional manner, i.e., by a reciprocating rod, while simultaneously causing the lever 164 to make the contacts of the switch 162. The contacts indicate to the control means 38 that the tone arm and thus the scanner 150 are in their non-operative state and effectively "turns off" the control means 38. The microswitch 162 remains actuated until the tone arm is dropped onto the outer periphery of the next record which has been dropped onto the record changer. Thereafter, the cam plate moves in a direction opposite that of arrow C to break the switch contacts 162 and signal the control means 38 that the scanner 150 again is operative. The switch means 160 is connected to an input line 173 as shown in FIGS. 11 and 16 of the drawings.

The prior art devices of this type, Stimler, Nakagiri and Osann, provide only a turntable which is not capable of sequentially playing a number of records. None of these prior systems show a method for precisely elevating the tone arm above the record which functions even when more than one record is stacked on the turntable. The present tone arm lift means 68 clearly is advantageous when compared to any of the previous systems, since it will accurately maintain the scanner 150 at a predetermined height above the level of the record regardless of whether only one or as many as six or more records are stacked on the turntable. Additionally, the power for moving the tone arm in its sweep or traverse mode across the record surface is derived directly from the turntable motor and thus no auxiliary tone arm drive motor is required. From an economic point of view, the present traverse system clearly is advantageous, for example, to that shown by Osann. Furthermore, due to the particular problem of record warpage which may exceed 0.050 inches in modern, thin, P.V.C. recordings, a system for stylus and tone arm elevation as disclosed here, is essential. Systems as previously shown in the reference patents cannot adequately maintain the required sensor-to-record distance during stylus up sweeping.

II. Electronic Elements

FIG. 11 shows an overall block diagram of the electronic components of the present invention. The keyboard 32, keyboard display 36 and tone arm switch 160 have been described before. The remaining input to the control means 38 is provided by the land sensor electronics 180 which include the electro-optic sensor 150 previously described. The remaining elements in the diagram are shown within the rectangle designated 38 as the control means. The control means 38 includes a keyboard buffer 184, a land counter 188, a selection counter 190, the memory 40 and a count comparator 192. As will be described in greater detail hereinafter, the land counter 188 increments upon a signal from the land sensor electronics 180, which count is compared with that retained in memory. The count comparator 192 constantly compares the count between the memory 40 and the land counter 188 and outputs the "sweep or traverse" signal 116 when the land counter does not coincide with that stored in memory.

Figure 10:
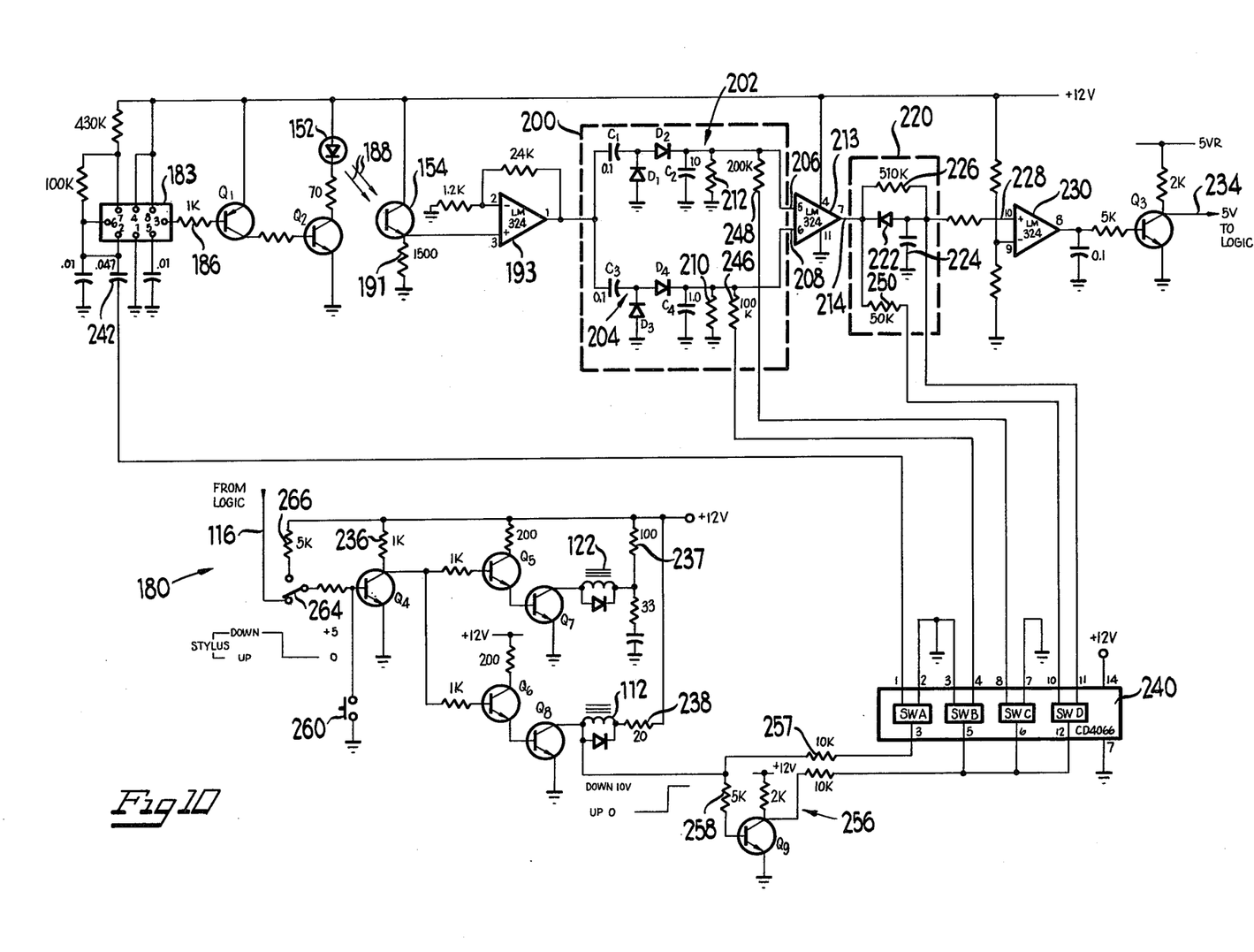
FIG. 10 is a schematic diagram of the land sensor electronics.

The land sensor electronics are shown in more detail in FIG. 10. Particularly, the land sensor electronics result in a logic "0" output when the stylus is above a modulated or sound track portion of the record and a logic level "1" whenever the land sensor 180 crosses an intraband land area on the record. The smoothness and greater width of the land area relative to the normal groove area of the modulated portion of the record results in an increase of reflected light energy received by the phototransistor 154.

Referring now to FIG. 10, a circuit is shown including a system of electro-optic discrimination between groove and land areas of the phonograph record not dependent upon the absolute values of reflection. Thus, the system is an adaptive device and can reliably indicate land areas regardless of the recording surface conditions. A 12-volt DC power supply powers the land sensor electronics or land detecting means 180. A pulse generator or oscillator 183 energizes the light emitting diode 152 through a current limiting resistor 186 and transistors $Q_1$ and $Q_2$ with narrow current pulses. Suitable elements for these devices are a 555 I.C. oscillator 183, a 2N2907A transistor $Q_1$ and a 2222A transistor $Q_2$. These pulses may have a duty cycle of 10–15% with approximately 145 milliamps peak current so as to allow high peak powers with a moderate sized light emitting diode 152. The light reflected from the light emitting diode to the phototransistor by the record surface is represented by arrows 188 as shown in FIGS. 8 and 9. The resultant output voltage developed across the phototransistor emitter load resistor 191 is applied to amplifier 193. The amplifier 193 may typically be one of four operational amplifiers such as one-quarter of an LM324 standard quad Op-Amp. The output of amplifier 193 is applied to an integrator 200 represented within the broken rectangle. The integrator 200 is an adaptive threshold device and includes an upper counter and integrator network portion, generally designated 202, having a long time-constant and a lower counter and integrator network portion, generally designated 204, having a shorter time-constant with respect to the former. These two networks produce two output levels whose amplitude varies as a function of reflected light energy per unit time. In the case of network 202, a longer term sample, taken over a period of several seconds, results in an output voltage 206 while the network 204, having a shorter time integration of energy, on the order of one second, results in an output 208.

More particularly, each of the networks 202 and 204 are similar except for the different time constant. Referring to the upper network 202, the pulse input signal from the amplifier 193 is applied to capacitor $C_1$, diode $D_2$ and capacitor $C_2$ in series. Both capacitors $C_1$ and $C_2$ attempt to charge to the peak value of the input signal from the amplifier 193. Typical values of the capacitors are 0.1 micro-farads for $C_1$ and 10 micro-farads for $C_2$. The charge of capacitor $C_2$ will be a fraction of the total peak input signal from the amplifier 192. This fraction will be largely determined by the ratio of capacitance between $C_1$ and $C_2$. In general, the voltage across $C_2$ will be inversely proportional to the ratio of $C_2$ to $C_1$. The function of diode $D_2$ is to discharge the capacitor $C_1$ during the negative going return or fall time of the input pulse from the amplifier 192. Thus, if capacitor $C_2$ is set at 100 times the capacitance value of $C_1$, it will take essentially 100 input pulses in order charge capacitor $C_2$ to a value approaching that of the peak value of the input signal. Hence, the circuit is a step counter with a 100 to one ratio such that 100 pulses are required to essentially reach the maximum output. A high value resistor 212 is connected in parallel with capacitor $C_2$ to discharge the capacitor at a predetermined rate. In addition, the value of the resistor 212 affects the maximum amplitude of the output voltage which the circuit can reach with respect to the peak value of the input wave form from the amplifier 193. For example, if the pulse generator 183 output is assumed to be 50 pulses per second, and the network 202 is assumed to have a capacitance ratio, $C_2$ to $C_1$, of 100 to 1, then it would take roughly 100 pulses, or two seconds, for the capacitor $C_2$ to obtain a charge somewhere near the peak value of the output of amplifier 193. If the resistor 212 is chosen to form a time constant with the capacitor $C_2$ of two seconds, the voltage attained across capacitor $C_2$ would leak off at a correspondingly slow rate. Therefore, short time variations of the order of fractions of a second in the output of phototransistor 152 are essentially ignored by the counter and integrator circuit 202.

In the lower portion network 204 the values of the capacitors $C_3$ and $C_4$ and resistor 210 are different than those used in network 202. The response of the network 204 will be substantially different. Typically, the capacitor values are 0.1 micro-farads for $C_3$ and 1.0 micro-farads for $C_4$ so that the ratio is ten to one. Additionally, the time constant between capacitor $C_4$ and resistor 210 is adjusted to be only a fraction of a second. Thus, it can be seen that the output 206 represents a long term integral of the power resulting from reflected light entering the phototransistor 154, whereas output 208 derived from the short time counter/integrator network 204 reflects nearly real time reflection conditions on the surface of the record being played. The small amount of integration and time delay which results from the action of the circuit 204 has the essential attribute of eliminating all extraneous, spurious, and, therefore, undesirable short term reflections resulting from localized imperfections on the surface of the phonograph record. Thus, the present invention accommodates large short term bursts of reflected energy resulting from localized defects which was not recognized or solved by any of the systems described in the prior art. Both of the systems in Osann and Stimler can operate on only a limited range of absolute values of reflectivity. The dynamic nature of the circuit 200 of the present invention and its ability to accommodate various levels of input signal, and, therefore, all varieties of record surface conditions, provide a clearly advantageous, fail-safe operation not heretofore shown in the prior art.

The outputs 206 and 208 of the integrator 200 are applied to the positive and negative input terminals respectively of comparator 213 whose output 214 drives a signal stretcher 220. The signal stretcher 220 includes a diode 222, a capacitor 224 and a resistor 226. The capacitor is normally charged to a voltage approaching the 12-volt DC supply through the resistor 226. This charging takes place during the prolonged period of positive output voltage from the comparator 213 associated with the playing of a band on a record. As described in connection with the integrator 200, the appearance of a land area below the electro-optic sensor 150 results in a sudden drop towards 0 voltage, or ground, at the output of the comparator 213 as the output 208 of the short time constant network 204 approaches the output 206 of the long term constant network 202. This sudden negative swing typically consists of one or more bursts at $T_1$, followed by a predetermined period $T_2$, during which a zero voltage level is maintained, and finally, followed by one or more bursts at $T_3$ resulting from the passage of the voltage level of the output 206 over that of 208. In the circuit 220, the first negative going wave point at the beginning of $T_1$ discharges the capacitor 224 through the low output impedance of comparator 213 and the equally low forward drop of the diode 222. As long as the output from the comparator 213 stays low, capacitor 224 remains essentially discharged. When the output of the comparator 213 returns to approximately 12 volts DC, the capacitor charges slowly through the resistor 226.

The output 228 of the signal stretcher 220 is applied to an inverter/comparator 230. When the voltage across the capacitor 224 exceeds approximately one-half of the supply voltage, the threshold voltage of the inverter/comparator 230, the comparator 230 toggles from one state to the opposite (i.e., from 0 output to approximately 12 volts output) terminating the land output pulse. The output 228 of the signal stretcher is the land area signal which is subsequently inverted and input to transistor $Q_3$. The five volt output of signal 234 of transistor $Q_3$ is applied to the control means 38 or logic system shown in FIGS. 11 through 18.

Since the detailed functioning of the integrator 200 is basic to an understanding of the present invention, consider the conditions obtained when a record is being played, that is when the stylus 60 of the phonograph pickup engages the sound modulated grooves of a desired sound track portion. Under those conditions, while using a 33 rpm record, the stylus, and hence the electro-optic scanner, approaches a land area at a relatively slow rate. In fact, a typical LP record has spacings from groove to groove of approximately 5 mils, and therefore requires approximately two seconds to traverse a distance of 5 mils. If the transition from groove to land area is taken as that of the minimum case, i.e., as one groove, approximately two seconds pass between the first reflection of the light beam from the edge of a land area until the complete super-position of the land area under the beam of the light emitting diode 152. The absolute amplitude of the reflected pulse beam during the past several seconds is entirely a function of the record's surface conditions including such elements as dirt, wobble of the record surface, and other artifacts. For example, the reflectivity of a record might exhibit a pronounced decrease in the last five or ten grooves, that is, in the last 10 or 20 seconds of a sound track selection area just prior to the appearance of an intraband land area. As a result, the absolute amplitude of the reflected light varies accordingly.

It is the practical purpose of the present invention to overcome the resultant problems. In particular, the appearance of land areas following pronounced dips in reflectivity over the prior band area are difficult to handle with systems disclosed in the prior patents. The present invention handles these situations by establishing a voltage level 206 which represents the average energy contained in the reflected radiation during a period of several seconds prior to the appearance of a land area and comparing that voltage level with the voltage level 208 generated by the network 204 which, due to a shorter time constant, has a voltage output responsive to very recent history of the reflected energy from the surface of the record. Due to its shorter time integration, network 204, in general, will be found to have an output level lower than that generated by the network 202, that is, 208 is generally lower and more negative than 206. Hence, the output 214 of the comparator 213 is maintained at a maximum positive level. The appearance of a land area as described above causes a transition level within a period on the order of two seconds from the time the beam first approaches the prior band areas and moves completely over the next land area. Network 204, due to its short time constant, can respond to this rapid variation in level, and therefore output 208 rises rapidly with respect to output 206. As soon as 208 exceeds 206, comparator 213 reverses its output 214 instantly driving that output to zero-level. This condition must be sustained for a period of time which depends upon various factors such as reflectivity of the surface and other conditions.

As described above, the signal stretcher circuit 220 accepts this negative going signal and develops an output which remains low for the duration of the negative going signal 214 and for some time after 214 has returned to a positive condition. The output 228 is applied to the inverter/comparator 230. One terminal of the comparator is referenced to a fixed voltage, such as one-half the power supply voltage in the drawings. This circuit converts the gradually positively increasing output of the signal stretcher 220 into a sharp logic level signal at the output of the comparator 230. The transistor $Q_3$ converts this output to a 5 volt logic level output 234 which is then applied to the control means 38.

The bottom left portion of FIG. 10 shows the circuitry which actuates the clutch solenoid 112 and the lift solenoid 122. As will be described in detail hereinafter, with respect to the logic system or control means 38, the output 234 to the control means 38, indicates the occurrence of a land area beneath the electro-optic scanner 150. If this land area indicates the beginning of a sound track selection which is programmed to be played in the memory 40, no sweep or traverse signal 116 is provided by the control means 38. However, if the signal 234 indicates a land area to the land counter 188 and the subsequent sound track selection has not been programmed into the memory 40 to be played, the count comparator 192 outputs the "sweep or traverse" signal 116. The traverse signal 116 drops from the 5 volt logic level to zero level at the base of transistor $Q_4$, causing $Q_4$ to open. The power supply voltage through resistor 236 saturates $Q_5$ and $Q_6$ and likewise the pair of transistors $Q_7$ and $Q_8$. The 12 volt power supply is then applied through appropriate resistors 237 and 238, respectively, to the tone arm lift solenoid 122 and the tone arm sweep clutch solenoid 112 which lift and pivot the tone arm 46 inwardly across the record in a sweeping mode as described previously with respect to the mechanical elements.

Because the tone arm is moving across the record surface at a much faster rate in the sweep mode, differences in the circuitry are required to accommodate both the stylus "down" as well as the stylus "up" positions as shown in FIGS. 9 and 8, respectively. In the sweeping condition, the energy reflected from the record surface exhibits a transition roughly fifty times faster than those obtained in the stylus "down" condition with the stylus riding in a record groove of a sound modulated portion. The present invention handles these differences in energy/time events by switching to shorter time constants for the integrator 200 when in the sweep mode. Additionally, the frequency at which the oscillator 183 pulses the light emitting diode 152 is also increased. Typically, this dynamic range of 50 to one has been accomplished by changing the pulse frequency of the pulse generator 183 by a factor of five and changing the time constants of the networks 202 and 204 and the signal stretcher 220 by a factor of approximately ten. The changes are effected in the circuit by four switches, one to change the pulse generator 184 frequency, two to change the integrator 200 time constants and one for the signal stretcher 220. Typically, these switches are implemented through the use of a CMOS PNP/NPN switch such as the currently available CD4066 quad CMOS switch 240 shown to the right in FIG. 10. Switch designated SWA deletes capacitor 242 from the circuit employed by the pulse generator 183 when the clutch solenoid 112 is energized increasing its pulse repetition rate by a factor of five from approximately 50 pulses per second to 250 pulses per second. Thus, referring to the integrator 200, the length of time required for the capacitors $C_2$ and $C_4$ to come up to their full charge is correspondingly shortened by a factor of five. Switches designated SWB and SWC add a 100k resistor 246 and a 200k resistor 248 to the networks 204 and 202, respectively, to reduce the time constant to approximately 1/10th that used under the previously described stylus down condition. This will obtain an overall circuit action of approximately fifty times faster than that used in the previously described stylus down position. Switch SW4 adds a 50k resistor 250 to the signal stretcher circuit 220 so that the signal stretcher operates at a correspondingly increased speed. The quad switch 240 is actuated by a signal driver, generally designated 256, shown at the bottom of FIG. 10. The switch driver is connected to one terminal of the clutch solenoid 112 which provides an input voltage of approximately 10 volts to the switch driver 256. In the stylus "down" position, this voltage is applied through the resistor 257 directly to switch SWA to maintain the capacitor 242 in the oscillator circuit. This voltage is applied through the resistor 258 to transistor $Q_9$, which saturates to maintain switches SWB, SWC and SWD in their open condition. When the tone arm is in its sweep or traverse mode, switch SWA opens, deleting the capacitor 242 from the oscillator circuit and the remaining switches close, inserting their respective resistors 246, 248 and 250 into the circuit. Thus, the overall land detector 180 operates approximately 50 times faster when the tone arm is in its traverse mode to accommodate for the substantially increased sweeping movement of the tone arm.

The above described land detecting circuit 180 functions in spite of considerable variations in the absolute reflectivity due to various surface conditions on a particular record. It is seen that the comparator 213 will reverse its state whenever the voltage at its negative input terminal 208 exceeds that of the voltage 206. Hence, the comparator 213 will function regardless of the absolute values of the voltages 206 and 208. In effect, this constitutes an adaptive threshold or automatic gain control action in which the reference level of 206 reflects a relatively long time integration of events quite similar to the integrated voltage used to provide automatic gain control functions in some electronic systems. It is this ability to provide an adaptive reference level 206 which reflects relatively longer term energy history that gives the system the ability to perform its function of recognizing land areas under all conditions of surface reflectivity. To further illustrate this circuit action, reference is again made to a record surface anomaly which will result in considerable difficulty for balanced systems such as those described by Nakagiri. In the system of that invention, sensor elements spaced very close together are used. While this arrangement can recognize rapid transitions from band to land areas, it is also susceptible to short term, high amplitude surface irregularities and resultant pulse outputs. This problem is obviated only by the slowness of response of the photo sensors referenced in the Nakagiri patent. Hence, the system of that invention depends upon a design in which the dimensional and response time characteristics of the sensor elements as well as its position with respect to the record surface all affect its ability to reliably indicate land to band area transitions. Such a balance is difficult to obtain in a way which will satisfy all possible recording surface conditions.

An additional feature is provided by a manual switch 260 (FIG. 2) on the front of the base. In many circumstances, it is conceivable that a user of this phonograph may preselect a particular band for playback and when that band begins to be reproduced, decide that he does not want to hear that particular band. This manual switch 260 (referring to FIG. 10), is spring biased to a normally open position. When the switch 260 is manually closed, the base of the transistor $Q_4$ is connected directly to ground. As previously described, in order to lift and traverse the tone arm across the record, a drop to zero level from the five volt logic level signal is required at the base of $Q_4$. The switch 260 permits the user to manually ground the base of the transistor $Q_4$ to provide a synthetic or artificial traverse signal to the circuit. By depressing this manual button 260, the undesired sound track being played is automatically skipped. This switch operates the switch driver 256 and the quad switch 240 which permit the land sensor electronics 180 to operate in the traverse mode and detect the land area at the end of that particular sound track selection. The logic or control means 38 can then take over and either play the next recording if preselected or continue to sweep until a count is reached which is coincident with that stored in the count comparator 192 for the next band to be played. Thus, this added manual button 260 provides a very desirable additional feature, in that it can be used as a manual cuing button capable of overriding the preprogrammed automatic band selector system.

Referring again to FIG. 10, a mode switch 264 is provided to override the logic system, for example, to operate the record changer in a conventional manner. The mode switch 264 connects the sweep or traverse signal 116 to the base of the transistor $Q_4$ in normal program type operation. The switch 264 can be moved to a second position to contact the power supply through the 5k resistor 266 to provide a "permanent" 5 volt logic level to the traverse and sweep electronics to maintain the lift solenoid 122 and the clutch solenoid 112 deactivated. In this mode, the record changer can be played in a conventional manner since the control means 38 is, in effect, inoperative to control the tone arm.

III. Logic System

Figure 12:
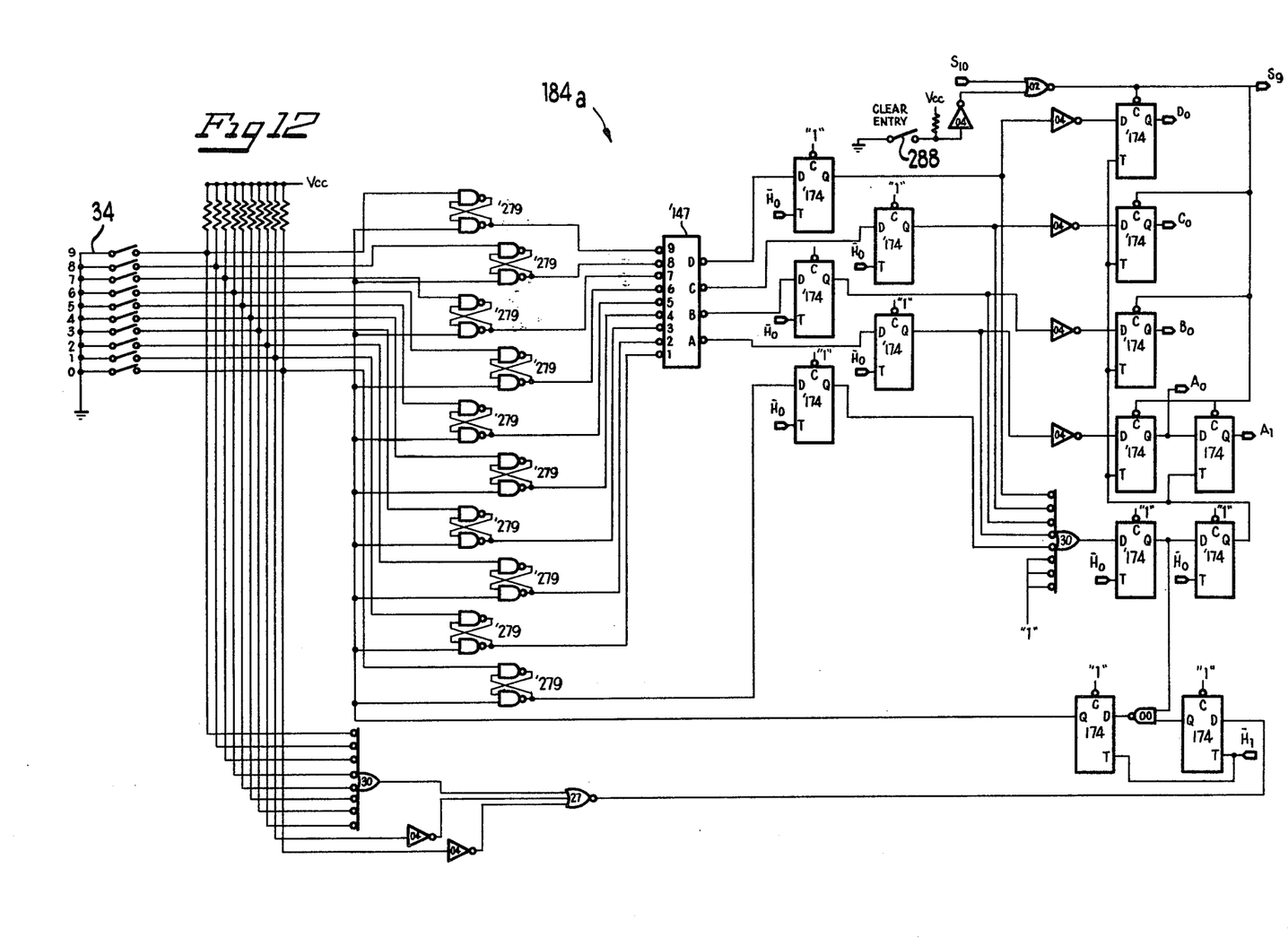
Figure 13:
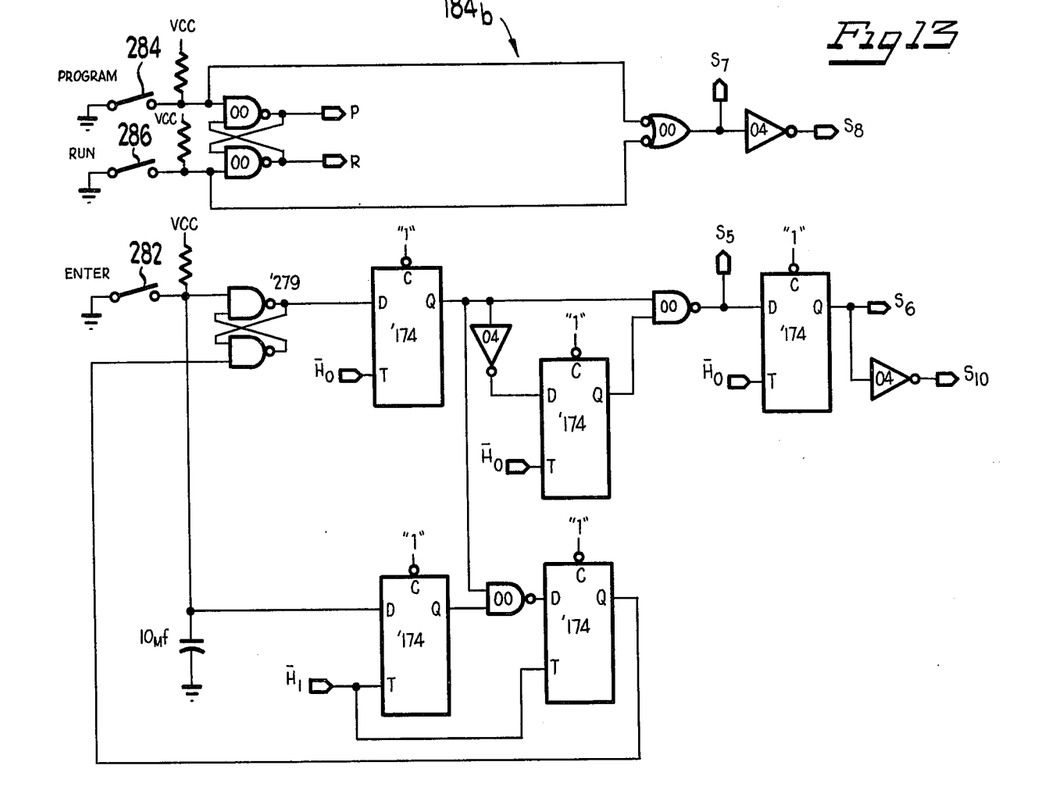
Figures 14, 17, 18:
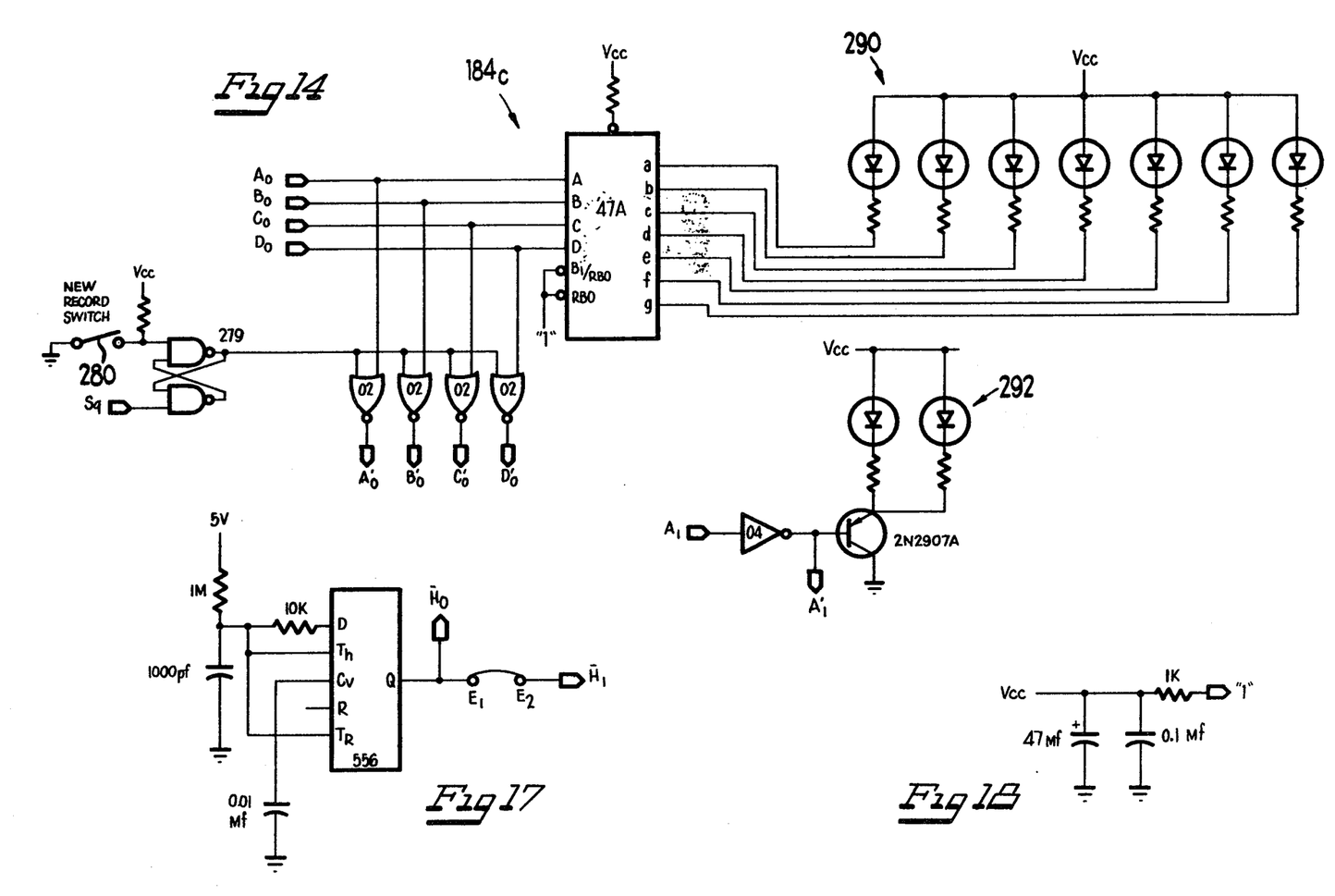
Figure 15:
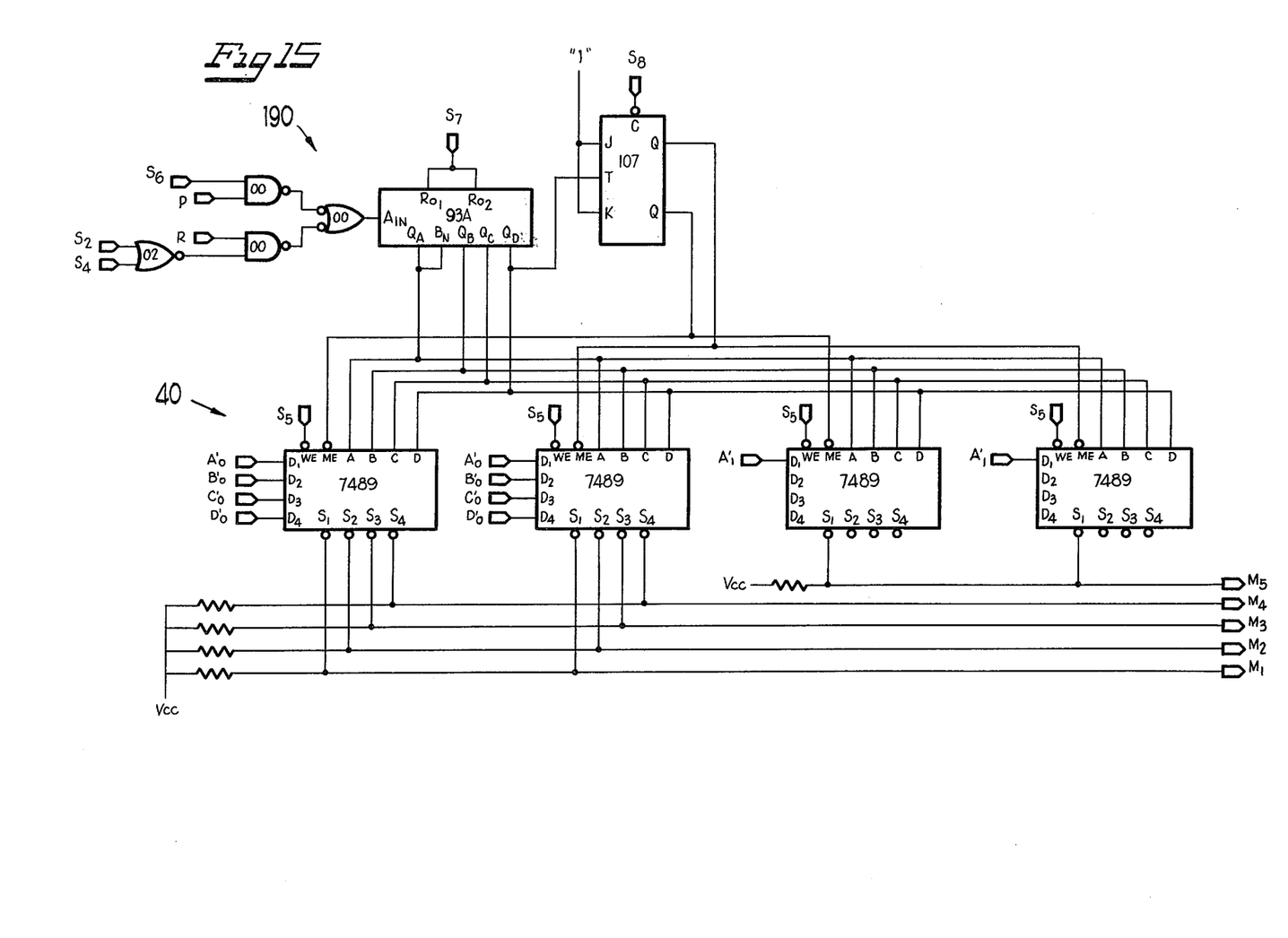

The logic system or control means 38 (FIG. 11) receives input from the tone arm switch 160, the land sensor 180 and the keyboard 32. The keyboard includes a plurality of keys 34 for the numerals zero through nine (FIGS. 2, 11 and 12), a "new record" key 280 designated NR, an "enter" key 282 designated E, a "program" key 284 designated P, a "run" key 286 designated R and a "clear" key 288 designated C. The program, run, and enter keys 284, 286 and 282, respectively, are shown in FIG. 13. The new record key 280 is shown in FIG. 14 and the clear key 288 is shown in the top of FIG. 12.

The digital display 36 shown at the top of the keyboard is connected to the keyboard buffer 184a, 184b, 184c of the control means 38. The display 36 includes two digits capable of representing the numerals 0 to 19. The seven light emitting diodes providing the ones digit are shown at the top of FIG. 14, generally designated as 290, and the tens digit is provided by the two light emitting diodes designated 292 in FIG. 14.

In order to operate the record changer in its programmable mode, the user first depresses the program key 284 to condition the logic for receiving the keyed in data. The user then presses the new record key 280 and enters the information by depressing the enter key 282. Finally, the record passages which the user is desirous of hearing are entered from the keyboard in a typical calculator fashion. The enter key is depressed after each entry to store this information in the memory 40. After each record has been programmed, the new record key is depressed to indicate that the following sequence is to be played from the next subsequent record. Lastly, the run key 286 is depressed to initiate the automatic control action and the records are stacked onto the phonograph spindle 54. Then the record player is turned on manually by the standard stop/start/auto control knob 296. The turntable will then play the plurality of records playing only those selections which have been preselected and stored in the memory 40 of the control means 38. For example, to program the record changer to play the first, third and fourth sound tracks of the record number one and the sixth and eighth sound tracks of record number two, the program would read: P, NR, E, 1, E, 3, E, 4, E, NR, E, 6, E, 8, E, NR, E, R.

The information keyed in by the keyboard is entered into the memory 40 via the keyboard buffer 184a, 184b, 184c. When a mechanical switch closes, its contacts bounce against each other before coming to rest. The keyboard buffer removes the voltage pulses caused by these bounces so that they will not confuse the remainder of the logic circuitry. The buffer also stores entries from the keyboard and shows them on the display 36, so that erroneous entries may be detected and corrected.

The selection counter 190 informs the memory as to which memory locations keyboard entries should be directed to or taken from. When sound track selections are being entered from the keyboard the selection counter is incremented each time the enter key is depressed.

The land counter 188 accepts inputs from the tone arm switch 160 and the land detector 180. The counter maintains the counter of the number of lands that have been traversed. The counter is initialized whenever the tone arm switch is triggered. This occurs when the tone arm is moved from its rest to the record by the phonograph mechanism. The counter is incremented whenever a land is reached. In this manner, the proper land count is maintained by the land counter. The count comparator 192 compares the present land count with that stored in memory. If the two counts are not equal, an error signal, the tone arm sweep or traverse signal 116 is generated. The selection counter 190 monitors this signal and that from the tone arm switch so that the current selection number is always fed from memory to the count comparator 192. The complete schematic drawings for the control means 38 are shown in FIGS. 12 through 18 for convenience and clarity. However, the elements used in the control means 38 are all commonly available commercial elements and have been assembled in the manner as shown to provide the function as described above. In FIGS. 12-18, the logic circuits 174, 47A, 7489, 93A, 107 and 74176 referred to commercially available TTL circuits manufactured by Texas Instruments as shown in "TTL Data Handbook for Design Engineers" published by Texas Instruments. The blocks are identified by the specific portions of the part numbers of the 7400 Series TTL circuits manufactured by Texas Instruments as commonly designated. The reference numeral 556 refers to a commercially available circuit manufactured by Signetics as shown in the "Signetics Data Manual" and commonly referred to by that number. A more detailed, element by element, description of these drawings is not necessary for a full and complete understanding of the present disclosure since it would be a routine exercise for one of ordinary skill to assemble a logic system to perform the above described function.

While many of the elements as used and described herein have been designated as a particular element or as having a particular value, they are meant to be exemplary only and may be modified according to the particular design required. All of the values, unless otherwise specified, of the resistors and capacitors are given in ohms and microfarads respectively as indicated on the drawings. It is to be understood that the foregoing detailed description has been given for clearness of understanding only and no unnecessary limitations should be understood therefrom as some modifications will be obvious to those skilled in the art.

We claim:

1. A programmable phonograph record player providing automatic sound track selection from a record having a plurality of sound track bands spaced apart by a plurality of intraband land areas, comprising:
    an electro-optic scanner including a source of radiation and a detector for radiation by said source reflected from the surface of a record;
    land sensing means connected to said detector and including means for developing a threshold signal which varies with the record surface reflectivity characteristics and means controlled in part by said threshold developing means for detecting the presence of a land area below the stylus by providing an output signal as said stylus encounters said land area;
    means for storing a predetermined selection of sound track bands to be played; and
    control means responsive to said output signal for positioning the stylus on the record to play the preselected sound track bands as stored in said storage means.

2. The programmable phonograph record player of claim 1 wherein said electro-optic scanner includes a light emitting diode and a phototransistor mounted on the phonograph tone arm so that the light emanating from the light emitting diode is reflected from the surface of the record to the phototransistor.

3. The programmable phonograph record player of claim 2 wherein the land sensing means includes an oscillator for pulsing said light emitting diode at a predetermined frequency to generate a predetermined amount of light energy to be emanated toward the record.

4. The programmable phonograph record player of claim 2 wherein the light emitting diode and the phototransistor are mounted by means for producing an angle between the emanating light and the reflected light of substantially more than 30°.

5. The programmable phonograph record player of claim 1 wherein said means for developing a threshold signal includes a first integrator having a predetermined time constant and a second integrator having a substantially shorter time constant.

6. The programmable phonograph record player of claim 5 including means for moving the tone arm between a play position, whereat the stylus is in engagement with the record grooves and a sweep position whereat the stylus is out of engagement with the record grooves.

7. The programmable phonograph record player of claim 6 including means for varying the respective time constants of said first and second integrators in response to movement of the tone arm between its respective play and sweep positions.

8. The programmable phonograph record player of claim 7 including an oscillator for pulsing the source of radiation at a predetermined frequency and means for varying the predetermined frequency of said oscillator in response to movement of the tone arm between its respective play and sweep positions.

9. The programmable phonograph record player of claim 6 including sweep means to move the tone arm across the record when the tone arm is in said sweep position.

10. The programmable phonograph record player of claim 9, including switch means for varying the respective time constants of said first and second integrator in response to movement of the tone arm to said sweep position to accommodate for the substantially faster movement of the tone arm when driven by said sweep means with respect to its movement in the play position.

11. A programmable phonograph record changer providing automatic sound track selection from a plurality of recordings, each recording having a plurality of sound track bands spaced apart from one another by a plurality of intraband land areas, comprising:
   an electro-optic scanner;
   land sensing means connected to said electro-optic sensor including means for developing a threshold signal which varies as a function of surface reflectivity to provide an output signal as said scanner detects an intraband land area;
   tone arm lift means for raising the tone arm to a predetermined elevated position with respect to any of said pluraity of records on the record changer;
   tone arm sweep means for moving the tone arm in a plane generally parallel with the record surface to permit the scanner to detect the intraband land areas; and
   a control means responsive to the output signal developed by said land sensing means and including a programmable memory for actuating the tone arm lift and sweep means to position the stylus on any one of the plurality of records to play a preselected sound track band as dictated by said memory.

12. The programmable phonograph record player of claim 11 wherein said tone arm lift means includes means mounting the same on the end of the tone arm.

13. The programmable phonograph record player of claim 12 wherein said tone arm lift means includes a pivotally mounted lever on the end of the tone arm for engaging the record surface and elevating the scanner to a predetermined height above the record surface.

14. The programmable phonograph record player of claim 13 including a solenoid engageable with said lever for moving the lever into engagement with the record surface upon a command signal from said control means.

15. The programmable phonograph record player of claim 14 including biasing means to normally urge the lever out of engagement with said record surface.

16. The programmable phonograph record player of claim 14 wherein said lever includes a resilient pad on the end thereof for engagement with the record to prevent damage to the recording surface.

17. The programmable phonograph record player of claim 11 wherein said tone arm is supported by a generally vertical, rotatable shaft and said tone arm sweep means includes a drive means selectively engageable with said tone arm support shaft for driving the tone arm across the record surface.

18. The programmable phonograph record player of claim 17 wherein said tone arm sweep means includes a selectively actuatable clutch between said drive means and said tone arm support shaft for engaging the drive means therewith for moving the tone arm across the record surface.

19. The programmable phonograph record player of claim 18 wherein said clutch means is actuated by a clutch solenoid, said clutch solenoid being connected to said control logic means for energization thereof in response to a command signal from said control means.

20. The combination of claim 11 including logic override means for disabling the tone arm lift and sweep mechanism to permit the record changer to operate in a conventional mode.

21. A programmable phonograph record changer providing automatic sound track selection from each of a plurality of recordings, each recording having a plurality of sound track bands spaced apart from one another by a plurality of intraband land areas, comprising:
   an electro-optic scanner including a light emitting diode and a phototransistor mounted on the phonograph tone arm so that the light emanating from the light emitting diode is reflected from the surface of a record to the phototransistor;
   land sensing means connected to said electro-optic scanner including an automatically adaptive threshold means for developing a variable threshold which indicates the presence of an intraband land area below said scanner and for providing an output signal as said scanner detects the intraband land area;
   tone arm lift means mounted on the end of the tone arm in proximity to the electro-optic scanner for raising the tone arm to a predetermined elevated position with respect to any of said plurality of records on the record changer;
   tone arm sweep means including a generally vertical rotatable shaft mounting said tone arm for rotation in a generally horizontal plane and drive means engageable with said tone arm shaft for driving the tone arm across the record surface in a plane generally parallel therewith to permit the scanner to detect the intraband land areas; and
   a control logic means responsive to the output signal developed by said land sensing means and including a keyboard and a programmable memory for storing the preselected sound track selections to be played and for actuating the tone arm lift means and the tone arm sweep means to position the stylus on any one of said plurality of records at the beginning of a preselected sound track band as dictated by said memory.

22. The programmable record changer or claim 21 wherein said tone arm lift means includes a solenoid actuated pivotally mounted lift lever on the end of the tone arm for engaging the record surface and elevating the scanner to a predetermined height above the record surface, said solenoid being actuated by said control logic means.

23. The programmable record changer of claim 22 wherein said tone arm sweep means includes a selectively actuatable clutch between said drive means and said tone arm support shaft for engaging the drive means therewith for moving the tone arm across the record surface to permit the scanner to detect the intraband land areas, said clutch being actuated by said control logic means.

24. The programmable record changer of claim 23 wherein said programmable means includes a random access memory connected to said keyboard to permit information related to a particular one of said plurality of records and a particular sound track band on any one of said plurality of records to be manually stored into said memory by the use of the keyboard.

25. A band selector providing automatic band selection from a recording having a pluraity of recorded bands spaced apart by a plurality of unrecorded land areas, comprising:
   transducer means positionable with respect to said recording;
   an electro-optic scanner; and
   land sensing means connected to said electro-optic scanner comprising an automatically adaptive threshold means for developing a variable threshold as a function of overall surface reflectivity which indicates the presence of an unrecorded land area adjacent the transducer means and for providing an output signal as said transducer means encounters an unrecorded land area.

26. The apparatus of claim 25 wherein said adaptive threshold means includes an integrating comparator for detecting the presence of an unrecorded land area adjacent the transducer.

27. The apparatus of claim 26 wherein said integrating comparator includes a first integrator having a predetermined time constant and a second integrator having a substantially shorter time constant.

28. The apparatus of claim 27 wherein said first and second integrators continuously receive the output of said scanner and each include a network having at least one resistor and one capacitor for providing an output signal, the output signal of said first integrator representing the amount of energy received by said scanner over a predetermined period of time and the output signal of said second integrator representing an amount of energy received by said sensor over a period of time substantially shorter than said predetermined period.

29. The apparatus of claim 28 including an amplifier connected to said first and second integrators for comparing their respective outputs and providing an amplifier output which signals the appearance of an unrecorded land area adjacent the transducer means.

30. A programmable record changer providing automatic sound track selection from a plurality of recordings, each having a plurality of sound track bands spaced apart from one another by a plurality of land areas, comprising:
   an electro-optic scanner including a source of radiation and a detector for radiation emitted by said source and reflected from the surface of a record;
   land sensing means connected to said detector and including means for developing a threshold signal which varies with the surface reflectivity characteristics of a record and means controlled in part by said threshold developing means for detecting the presence of a land area below the stylus by providing an output signal as the stylus encounters said land area;
   tone arm lift means mounted on the free end of the tone arm for raising the tone arm to a predetermined elevated position with respect to any of said plurality of records on the record changer;
   tone arm sweep means for moving the tone arm in a plane generally parallel to the record surface to permit the scanner to detect the land areas; and
   programmable means for storing a predetermined selection of sound track bands to be played and positioning the stylus on the record under the control of said output signal to play said preselected sound track bands.

31. The programmable record changer of claim 42 wherein said tone arm lift means includes a lever mounted on the end of the tone arm for engaging the record surface.

32. The programmable phonograph record player of claim 31 wherein said programmable means includes a random access memory and a keyboard connected thereto to permit information to be manually stored in said memory by use of said keyboard.

33. In a programmable phonograph record player of the type providing automatic sound track selection from a record having a plurality of sound track bands spaced apart by a plurality of intraband land areas, the combination of:
   an electro-optic scanner including a light source and a detector for radiation emitted by said source and reflected from the surface of a record; and
   land sensing means connected to said detector and including means for establishing a first signal which represents the average energy contained in said reflected radiation over a first time interval, means for establishing a second signal which respresents the energy contained in said reflected radiation during a second time interval which is relatively short as compared to said first time interval, and means jointly responsive to said first and second signals for developing an output signal when the intraband land area is encountered.

34. The combination of claim 33 wherein the first time interval is approximately one order of magnitude greater than said second time interval.

35. The combination of claim 33 including manually operable means for developing an artificial output signal to terminate playing of a particular sound track band.

36. The programmable phonograph record player of claim 33 wherein said means for establishing said first signal includes integrating means for averaging the energy contained in said reflected radiation over said first time interval.

37. The programmable record player of claim 33 wherein said means for establishing said first signal includes first integrating means having a predetermined time constant and said means for establishing said second signal includes second integrating means having a substantially shorter time constant than said predetermined time constant.

38. The programmable record player of claim 33 including means for comparing said first and second signals to provide said output signal.

39. The programmable record player of claim 33 including means for producing said output signal in response to variations in said second signal relative to said first signal.

* * * * *